(12) United States Patent
Sellen et al.

(10) Patent No.: US 7,721,224 B2
(45) Date of Patent: May 18, 2010

(54) ELECTRONIC CALENDAR WITH MESSAGE RECEIVER

(75) Inventors: Abigail Sellen, Cambridge (GB); Richard Harper, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 479 days.

(21) Appl. No.: 11/681,044

(22) Filed: Mar. 1, 2007

(65) Prior Publication Data

US 2008/0215990 A1    Sep. 4, 2008

(51) Int. Cl.
    *G06F 3/048*    (2006.01)
(52) U.S. Cl. .................. 715/804; 715/764; 715/963
(58) Field of Classification Search .............. 715/963, 715/764, 804
    See application file for complete search history.

(56) References Cited

U.S. PATENT DOCUMENTS

| | | | |
|---|---|---|---|
| 4,783,800 A | 11/1988 | Levine | |
| 5,416,473 A | 5/1995 | Dulaney, III et al. | |
| 5,864,848 A * | 1/1999 | Horvitz et al. | 707/6 |
| 5,936,625 A * | 8/1999 | Kahl et al. | 715/775 |
| 6,094,681 A | 7/2000 | Shaffer et al. | |
| 6,104,788 A | 8/2000 | Shaffer et al. | |
| 6,697,942 B1 | 2/2004 | L'Heureux et al. | |
| 6,941,349 B2 | 9/2005 | Godfrey et al. | |
| 7,353,465 B2 * | 4/2008 | Callaway et al. | 705/8 |
| 7,376,909 B1 * | 5/2008 | Coyle | 715/778 |
| 2003/0014296 A1 * | 1/2003 | Meine | 705/9 |
| 2003/0045301 A1 | 3/2003 | Wollrab | |
| 2003/0222764 A1 | 12/2003 | Slote | |
| 2004/0168118 A1 | 8/2004 | Wong et al. | |
| 2005/0034338 A1 * | 2/2005 | Footman | 40/107 |
| 2007/0033255 A1 | 2/2007 | Sanjeeva et al. | |
| 2007/0124677 A1 * | 5/2007 | de los Reyes et al. | 715/705 |
| 2008/0285389 A1 * | 11/2008 | Borovsky et al. | 368/10 |

OTHER PUBLICATIONS

Cheverst, et al., "Exploring Mobile Phone Interaction with Situated Displays", available at least as early as Feb. 27, 2007, at <<http://www.caside.lancs.ac.uk/publications/PERMID.pdf>>, pp. 1-5.

(Continued)

*Primary Examiner*—Dennis-Doon Chow
*Assistant Examiner*—Rashawn Tillery
(74) *Attorney, Agent, or Firm*—Lee & Hayes, PLLC (57) ABSTRACT

It is difficult to effectively manage an electronic calendar that is shared by a group of people such as family members. This is achieved by enabling users to send messages to an electronic calendar apparatus. The messages are received and stored at the apparatus and may be viewed by a user such as a mother of a family. A graphical user interface at the calendar apparatus provides a calendar and a message receiver region. A user is able to edit the calendar using information from the messages and in some examples may move or copy message indicators into the calendar from the message receiver region. In some examples, the calendar may only be edited by user input received directly at the calendar apparatus rather than from a remote location. The calendar apparatus may be provided in a protective housing to enable the apparatus to be used in a domestic kitchen.

20 Claims, 7 Drawing Sheets

OTHER PUBLICATIONS

Cheverst, et al., "SPAM on the Menu: the Practical use of Remote Messaging in Community Care", available at least as early as Feb. 27, 2007, at <<http://www.cems.uwe.ac.uk/~cjwallac/UFIE8V-2004/p23-cheverst.pdf>>, ACM, 2003, pp. 23-29.

"Netsimplicity", retrieved on Feb. 20, 2007, <<http://www.netsimplicity.com/company/news/0720-04.asp>>, pp. 1-2.

Neustaedter, et al., "LINC, An Inkable Digital Family Calendar", available at least as early as Feb. 27, 2007, pp. 1-2.

Neustaedter, et al., "Linc-Ing" The Family: The Participatory Design of an Inkable Family Calendar, available at least as early as Feb. 27, 2007, ACM, 2006, pp. 1-10.

Yankelovich, "Talking Vs Taking: Speech Access to Remote Computers", available at least as early as Feb. 27, 2007, at <<http://delivery.acm.org/10.1145/270000/260488/p275-yankelovich.pdf?key1-32 260488&key2-32 6479452711&coll-32 GUIDE& dl=GUIDE&CFID=15435051&CFTOKEN=22232671>>, ACM, 1994, pp. 275-276.

* cited by examiner

ELECTRONIC CALENDAR WITH MESSAGE RECEIVER

BACKGROUND

Scheduling and remembering appointments for a group of people such as constitute a family can be difficult. Co-ordination of activities of different individuals is a complex task that entails planning, rescheduling, cross-referring and then replanning as well as delicate skills of diplomacy. As a consequence 'family calendaring', to coin a verb, has a number of particular properties. First, it is mainly carried out by one family member, most often the mother. This person has the difficult and delicate task of representing the doings of numerous other members of the family so as to make those doings visible to all whilst being responsible for this task herself, alone. Second, and relatedly, where calendars are located, and further, where most of the interaction with them is undertaken, tends to be in one particular place. This place is not merely contingent on where a family resides, but is selected because the location is one that ensures maximum visibility of the calendar to all those affected by it. Furthermore, the location is chosen so that when changes are made, by the mother for example, the acts of making these changes are more likely to be seen by those affected. Finally, the location is chosen so as to ensure that the calendar is juxtaposed to other material artefacts, letters, notices, scribbled notes, etc, that are at various times relevant. As a consequence, most family calendars are paper-based, and displayed or hung in family kitchens.

Family calendars, then, have particular properties, related to what they are used for, who they are used by and where they are located. This creates various deficiencies and problems. Most obviously, family calendars are difficult to access from the many locations that different family members may find themselves during the day. For example, if a child of the family is at a sports session with their mother and finds out important information about a change of time for the next session, that child or their mother is unable to immediately add that information to the calendar. By the time they reach home the new time for the next session may well be forgotten. Some families use multiple paper and digital calendars to avoid this problem but this leads to problems in synchronizing information between those calendars. Further, the need to cross reference items on a family calendar to other materials—notes, letters, as mentioned—means that understanding the implications of a new calendar event when remote for the main calendar is not always possible or ideal. Finally, the act of making such changes may be less visible to those affected if those individuals are not the ones making the changes.

Various attempts have been made to help ease these and other difficulties. Web-based digital family calendars are available, for example, whereby family members are able to access and edit a shared calendar using a web-browser from different locations, such as at the office, in the home and at school. But these have their own set of problems. First, nearly all such calendars require qwerty keyboard data entry and WIMP interface devices; in other words they assume that wherever family members might be, and irrespective of what family members might be doing, they will have access to the appropriate input devices. As the example of a child and his mother attending a sports session above indicates, this cannot be guaranteed. Indeed, this is precisely the main problem of such web-based solutions: they presume uniformity of input.

This is not the only problem these web-based systems suffer from. A further one, also made clear in the sports event example, is that they suffer from the fact that remote decision making is often based on deficient levels of information, much of that which is relevant to the calendar being displayed alongside it in the home setting. This information, often but not always paper-based, is not visible remotely.

A further problem with remote calendaring systems is related to the need to ensure that when changes are made those changes are made visible to those effected.

If these are problems that web-based systems have when considered from the remote users point of view, they also provide difficulties locally, at home. If remote users find qwerty-wimp interface devices difficult to access, then it is also the case that such devices are inappropriate in the primary domain, such as in a kitchen. Here, users may find it undesirable to use a keyboard and mouse, having foodstuffs on their fingers; kitchens may also be unsuitable places for keyboards and mouse anyway with flecks of flour, bread, and greasy material likely to suffuse and render inoperative keyboards and mouse.

Some attempts have been made to deal with these various problems. The most successful to date have entailed the use of stylus-based tablets with bespoke calendaring applications that allow remote viewing and editing.

Nevertheless, the difficulty of providing an ideal solution to the family calendaring problem and, in particular, problems such as related to mode of interaction remotely and distinguishing it from that possible locally, are not completely solved by these solutions. A number of additional solutions have been offered, and these focus in particular on the problem of the remote mode of interaction. The most common entail web-based access to calendars over mobile phones, whereby data entry is enabled through the use of 'one-handed' input techniques. These combine data entry on non-qwerty keyboards with soft button data entry (i.e. buttons that change function dependent upon task) and navigation through predefined screens enabled by interaction with what might be described as the mobile phone analogue to the PC mouse, namely the 'navi-key'. Despite their functionality, these designs universally suffer from very poor usability, however. Users find them complex and slow; they also find errors easy to make and corrections difficult to impose. The result is that most users avoid trying to access and interact with their calendars in this way.

It is known to use a tablet personal computer (PC) in place of a family paper wall-calendar. In this way a digital family calendar is provided which is inkable in that family members are able to edit it using electronic ink. Using a graphical user interface, a calendar display is presented on the tablet PC. With a tablet PC stylus a user is able to hand-write in electronic ink on the calendar to make, delete or edit entries. Multiple client computers may be arranged to provide the calendar display using a remote server to synchronize the calendars. It is also known to make this type of calendar accessible via a web-browser to enable family members to view and edit the calendar from different locations via the Internet. A tracking component is provided with the calendar to track changes and present a change history to enable family members to tell what changes have been made by other members.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

It is difficult to effectively manage an electronic calendar that is shared by a group of people such as family members. This is achieved by enabling users to send messages to an electronic calendar apparatus. The messages are received and stored at the apparatus and may be viewed by a user such as a mother of a family. A graphical user interface at the calendar apparatus provides a calendar and a message receiver region. A user is able to edit the calendar using information from the messages and in some examples may move or copy message indicators into the calendar from the message receiver region. In some examples, the calendar may only be edited by user input received directly at the calendar apparatus rather than from a remote location. The calendar apparatus may be provided in a protective housing to enable the apparatus to be used in a domestic kitchen.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in a family calendar system, the system described is provided as an example and not a limitation. As those skilled in the art will appreciate, the present examples are suitable for application in a variety of different types of calendar systems where groups of two or more people or other entities share a calendar to assist with co-ordinating their activities in domestic or other environments.

Electronic Calendar Apparatus Examples

Figure 1:
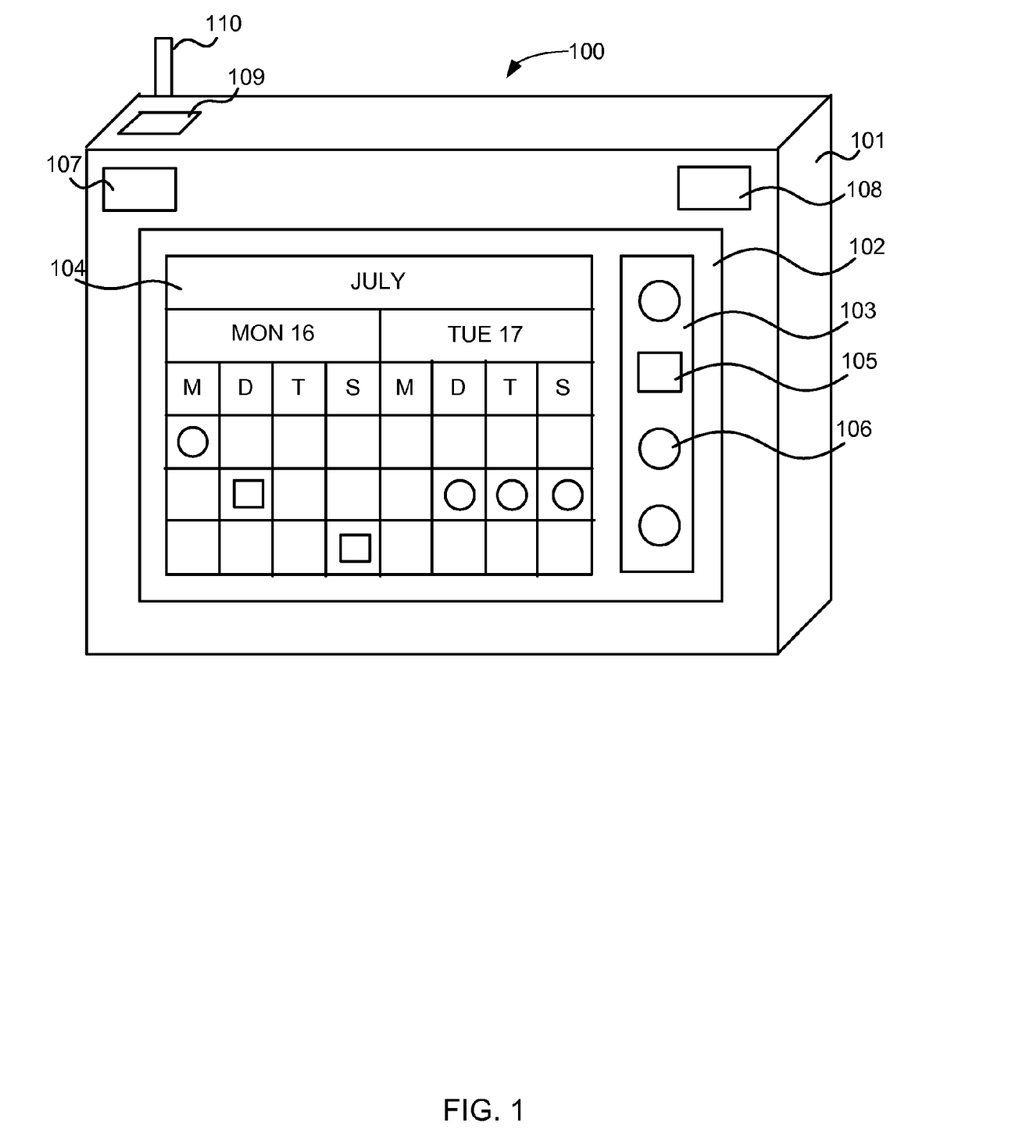
FIG. 1 is a schematic diagram of an example electronic calendar apparatus.

FIG. 1 is a schematic diagram of an example electronic calendar apparatus 100 having an optional protective housing 101 in order that the apparatus may be used in a domestic kitchen or any other suitable location. For example, the housing may be formed such that it protects the apparatus from moisture and changes in temperature as well as from any knocks and jolts during use in a busy family kitchen. If the apparatus is intended for use in other environments the housing may be omitted as appropriate.

The apparatus incorporates a display 102 of any suitable type. This display may be a touch sensitive or any other type of interactive screen. For example, a tablet PC may be used to provide the electronic calendar apparatus 100 such that the display 102 is inkable in that it may be written on with a stylus to form electronic ink. It is also possible to use a display having an associated input apparatus such as a keyboard and mouse, or other input apparatus. The display is thus of any suitable type that enables a graphical user interface to be provided whereby users are able to manipulate graphical items on the display in order to interact with the calendar apparatus.

The display is arranged to provide a graphical user interface comprising a calendar 104 and a message receiver graphical user interface 103. The calendar 104 is a graphical user interface display of calendar information. In the example of FIG. 1 two days in the month of July are indicated with fours columns available in each day for information about four different family members. However, this is only one example, calendar information may be presented in any suitable format and manner.

The message receiver graphical user interface 103 comprises message indicators 105, 106 which in this case are icons of different shapes where the type of shape is intended to indicate a type of message. The message indicators represent individual messages that have been received and stored in the calendar apparatus. However, it is not essential to use icons; any suitable type of message indicators may be used.

The calendar apparatus optionally comprises a loudspeaker 107 and also optionally, a microphone 108. Also provided is a message receiver 109 which may have an associated antenna 110. The message receiver 109 is of any suitable type for receiving messages such as voice messages, short message service (SMS) messages, email, video messages, images or messages of any other type. For example, the message receiver may have an associated subscriber identification module within the apparatus and optionally a general packet radio service (GPRS) card. The message receiver 109 may also comprise a message transmitter of any suitable type.

Figure 2:
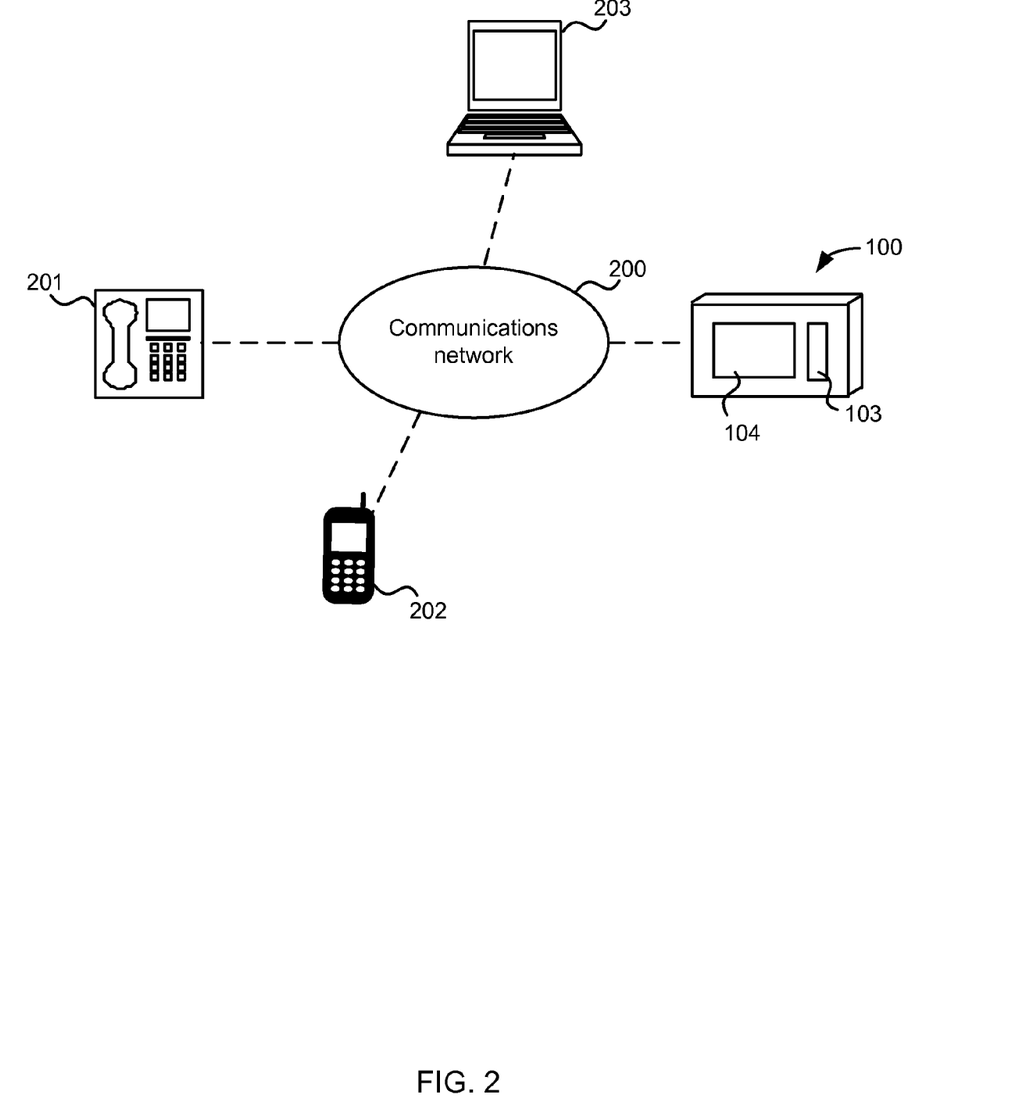
FIG. 2 is a schematic diagram of the electronic calendar apparatus of FIG. 1 in communication with a communications network.

FIG. 2 is a schematic diagram of the electronic calendar apparatus 100 of FIG. 1 in communication with a communications network 200. A variety of communications terminals may be present in the communications network 200 such as mobile telephones 202, land line telephones 201, personal computers 203 or any other communications terminals. The calendar apparatus 100 is arranged to receive messages from communications terminals over the communications network 200. In some examples, the calendar apparatus is also arranged to send messages to other communications terminals.

Example Methods

The electronic calendar apparatus 100 may be used for example, by a family or other group of users sharing a single calendar. One user, typically the mother of the family, or other designated user, acts as family co-ordinator and may be the only member of the family able to edit the calendar. It is not necessary to provide password access or other control means to ensure that only the designated user may edit the calendar. Typically, in a family situation, this control is achieved through family communication rather than using formal passwords or other methods.

Family members (or other users) are able to send messages to the calendar which are received and stored at the calendar. These messages can be considered as requests for edits to the calendar. The mother or other designated user is able to quickly and simply view the messages at the calendar and make any edits to the calendar that she sees fit. For example, the mother may click and drag message items from the message receiver graphical user interface into the calendar. In some examples, the mother or other designated user is only able to edit the calendar by making user actions directly at the calendar apparatus. For example, if the calendar is in a domestic kitchen, the mother would only be able to edit the calendar when in her kitchen. It has been found that this type of calendar apparatus is particularly effective for use by families or other groups of users sharing a calendar. Family members are able to send in requests that are managed by a single person, such as the mother, at a single location, in order to achieve simple and effective co-ordination of activities. In this way the extent and mode of interaction possible locally and remotely is distinguished such that use of the calendaring tool does not lead to incorrect judgments about the appropriateness or the visibility of changes in calendar entries.

This form of remote data entry onto calendars is made possible via messaging, such as voice messaging. For example, the user has the choice to call the calendar (or diary) in question and leave a 'voice note' on the same. Remote access to calendars is then provided when it is possible, desirable and usable (such as when a qwerty wimp device is at hand, for example).

Figure 3:
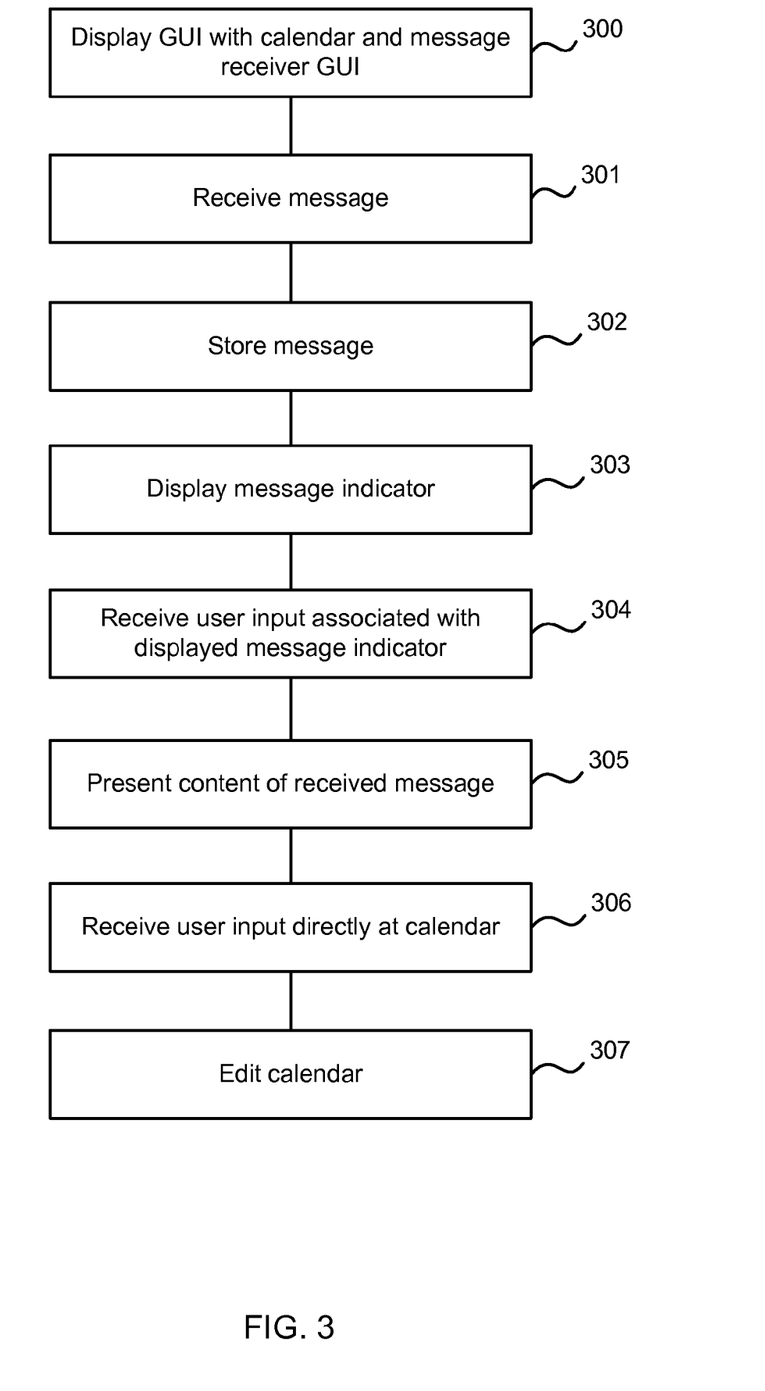
FIG. 3 is a block diagram of an example method at an electronic calendar apparatus for editing the calendar.

FIG. 3 is a block diagram of an example method at an electronic calendar apparatus for editing the calendar. A graphical user interface comprising a calendar and a message receiver graphical user interface is displayed (block). The apparatus receives a message (block 301) of any suitable type as mentioned above. For example, a user may simply leave a message at a prompt made by the calendar apparatus. In other examples, the calendar apparatus presents interactive dialogues to the user, for example using interactive voice response technology, web-based interfaces, email messages or any other suitable methods. For example, a user may be prompted to leave a message on an appropriate day or time slot through the use of such interactive dialogues. In the case of voice messaging, interactive voice dialogues may be used such that the user only uses voice as the mode of data entry once contact with the calendar in question has been made.

The received message is stored (block 302) and a message indicator is displayed (block 303) at the message indicator graphical user interface. In some examples, the message indicator comprises explicit information about the identity of the sender of the received message. For example, the message indicator may comprise the sender's name, an image of the sender's face or any other icon representing the sender. The calendar apparatus may be arranged to obtain the information about the identity of the sender in any suitable manner. For example, this information may be extracted from the received message or may be obtained by accessing caller line identity information incorporated or associated with a voice message. The calendar apparatus may comprise a database of images, icons and/or other graphical caller identity information for use in the message indicators. The database also stores information about caller line identity or similar information associated with each image, icon or other graphical information. Using the database, the calendar apparatus is able to select an appropriate image, icon or name for example to use in a message indicator. However, it is not essential to give explicit information about the identity of a sender of a received message in the message indicator. For example, in the case of a voice message, the voice itself may be used to recognize identity when the message is replayed.

User input may be received associated with a displayed message indicator (block 304). For example, this may be a mouse click, stylus input or screen touch at the message indicator. The content of the received message is presented (block 305). For example, in the case of a voice message, this is played back using a loudspeaker embedded in the apparatus or is converted to text and displayed graphically at the user interface. Images or video clips are presented in a suitable manner as are email messages and short message service messages. For example, a separate pop-up window may be used to present the messages or these may be presented directly in the message receiver graphical user interface.

User input may be received at the calendar (block 306) and as a result the calendar is edited (block 307) and stored. This user input is of any suitable type as mentioned above, such as electronic ink written using a stylus on a tablet PC screen. In some cases, the user is able to drag or copy message indicators into the calendar where they are stored.

Thus message indicators may be displayed on the calendar graphically, as objects that may be moved around for example by 'dragging and dropping' either by stylus or touch sensitive screen finger commands so that users may manage calendar entries as they see fit. This is especially important in family calendaring situations where events, timings, participation and duration are all likely to be subject to change regularly and continuously. A further property of such changes is that they tend to be ad hoc, reflecting the vagaries and contingency that is the norm of family life. Thus, in some examples, the movement and control of event items, as represented by a voice note, are not subject to more systematic solutions, such as might be provided by machine intelligence, for example.

In some examples the options for moving message indicators in the graphical user interface are dependent upon the arrangement of the calendar as a visual object with fields of its own. For example voice messages may be dragged and dropped from what might be called the 'calendar in-tray' (message receiver graphical user interface) to the 'Tuesday a.m.' category or to the 'Tuesday p.m.' category as appropriate. Once there, their status as voice calendar entries may be indicated by their chosen iconic form (for example, bubble icons to indicate voice messages). Furthermore, their movement to those locations may be indicated by differences in color, shape, or naming.

In some examples, the calendar may only be edited as a result of user input received directly at the calendar apparatus rather than being communicated from a remote location such as over a web-based interface. In this case, active monitoring mechanisms may be incorporated into the electronic calendar apparatus to monitor for and prevent remote editing access to the calendar. Alternatively, passive methods are used which involve ensuring that functionality for enabling remote editing access of the calendar are disabled at the calendar apparatus.

In this way, it is possible to only allow interaction with message indicators in the location in which it is most practical, for example, the ecological domain of the home setting, such as on a kitchen wall or noticeboard. In this example, all the information affecting calendar changes can only be seen from the kitchen wall or noticeboard. This increases the likelihood that when changes are made to the calendar these changes are seen by those affected, such as the mother and other family members in the kitchen. In addition, by only allowing editing of the calendar from the calendar apparatus itself, errors in calendar editing are reduced.

In some examples, the calendar may be viewed from remote locations. For example, over a web-based interface or using any other suitable remote viewing access technology.

Example Graphical User Interface

Figure 4:
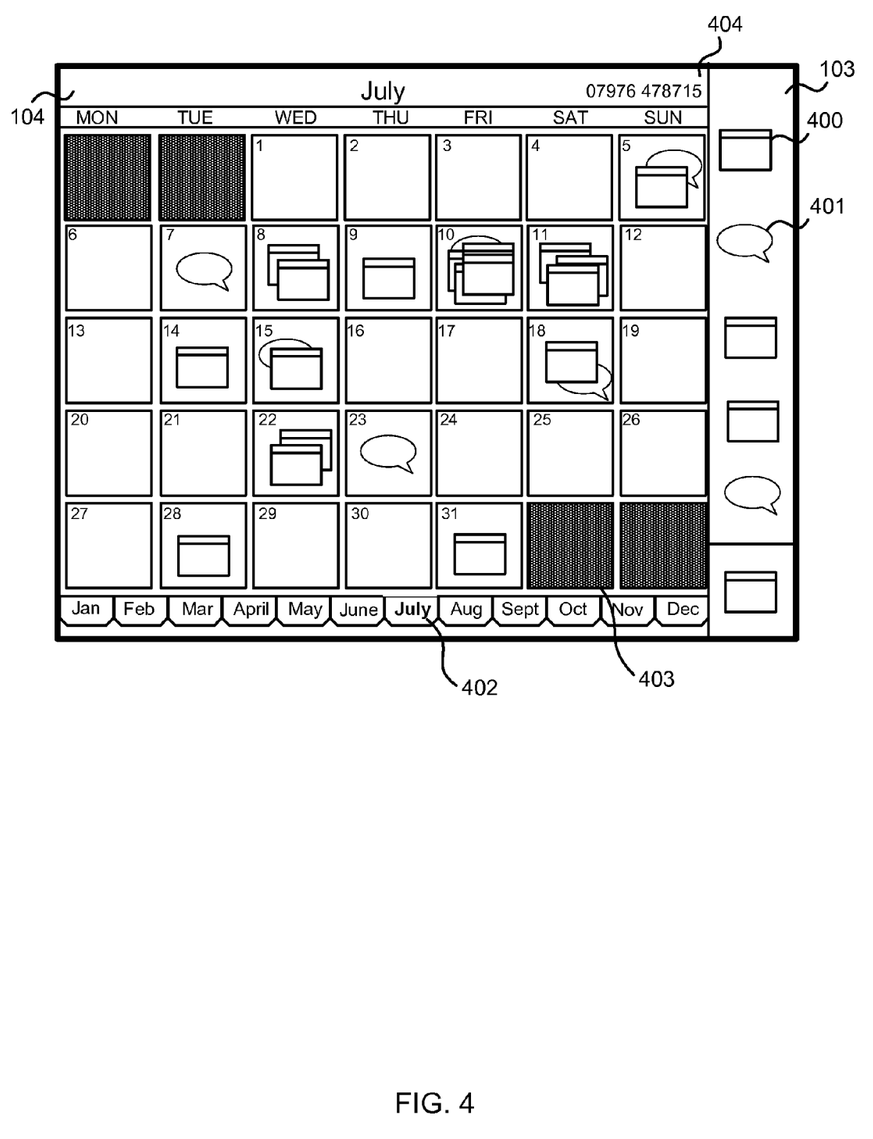
FIG. 4. is an example of a graphical user interface display at an electronic calendar apparatus.

FIG. 4. is an example of a graphical user interface display at an electronic calendar apparatus. It comprises a message receiver graphical user interface 103 and a calendar 104. The message receiver graphical user interface 103 comprises message indicators 400, 401 which in this case are icons with a bubble icon 401 intended to represent a voice message and a rectangular icon intended to represent a text-based message such as an email, short message service message or the like. The calendar 104 in this example is currently showing the month of July with one column for each day of the week and one square for each day. The month of July is shown as one tab of 12 tabs, one for each month of the year. Squares 403 representing days not in July are shaded or cross hatched. Message indicators may be stored in calendar squares as indicated. For example, the square for Sunday $5^{th}$ July comprises two message indicators, one for a voice message and one for a text-based message. By clicking or selecting these message indicators in the calendar a user is able to activate presentation of the complete associated message. For example, this may comprise playback of a voice message associated with the bubble icon. The graphical user interface may also display a telephone number 404 to which messages may be sent for receipt at the calendar apparatus. Similarly an email address or other address of the calendar apparatus may be displayed.

Another Example Method

Figure 5:
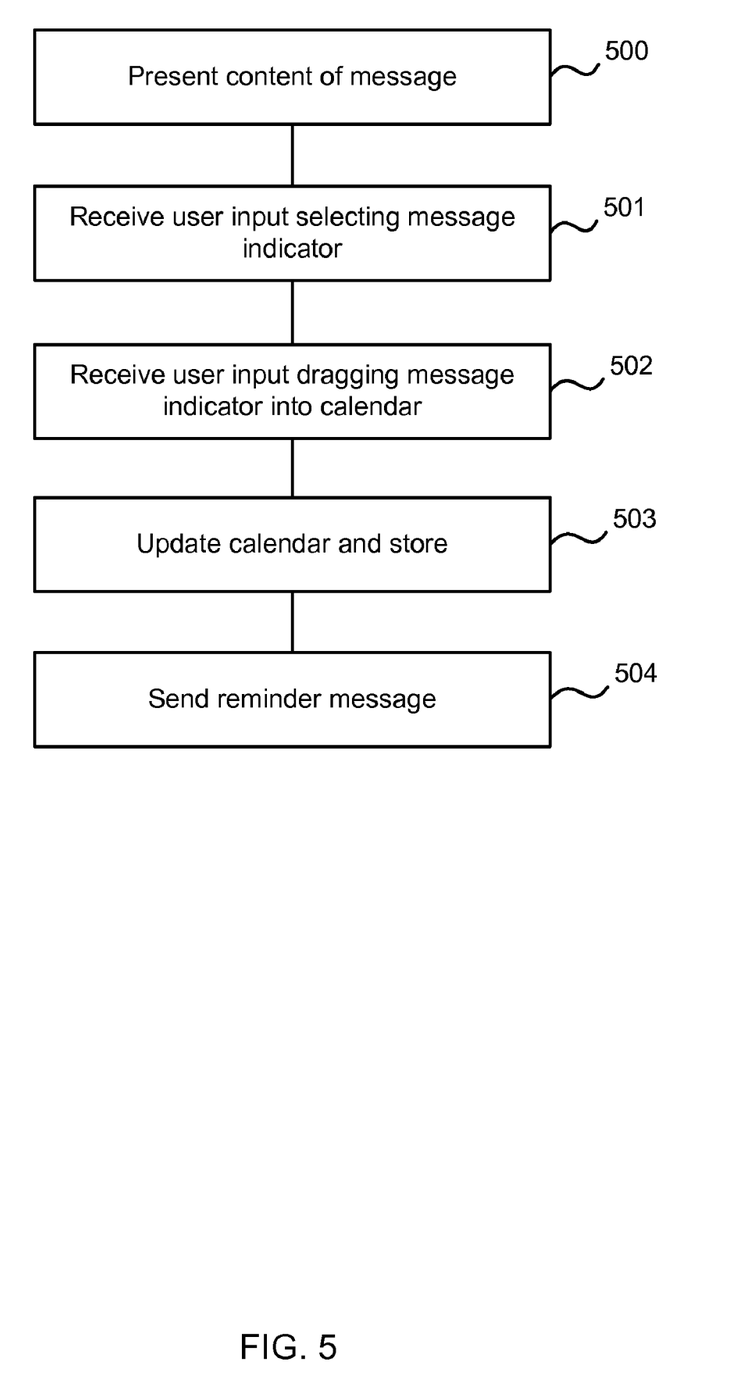
FIG. 5. is a block diagram of an example method dragging a message indicator into a calendar using an electronic calendar apparatus.

Suppose that one or more messages have been received at the calendar apparatus. A mother views these messages using the calendar apparatus, for example in her kitchen and now requires to edit the calendar. The calendar apparatus presents message content (block 500) and receives user input (for example, from the mother) to select a message indicator (block 501). The calendar apparatus receives user input dragging or copying the message indicator into the calendar (block 502) and proceeds to update and store the calendar (block 503). Optionally the calendar apparatus is able to send a reminder message (block 504) to a communications terminal about one or more items stored in the calendar. This reminder message may be sent in any suitable form such as email, SMS, voice message etc.

Another Example Method

Figure 6:
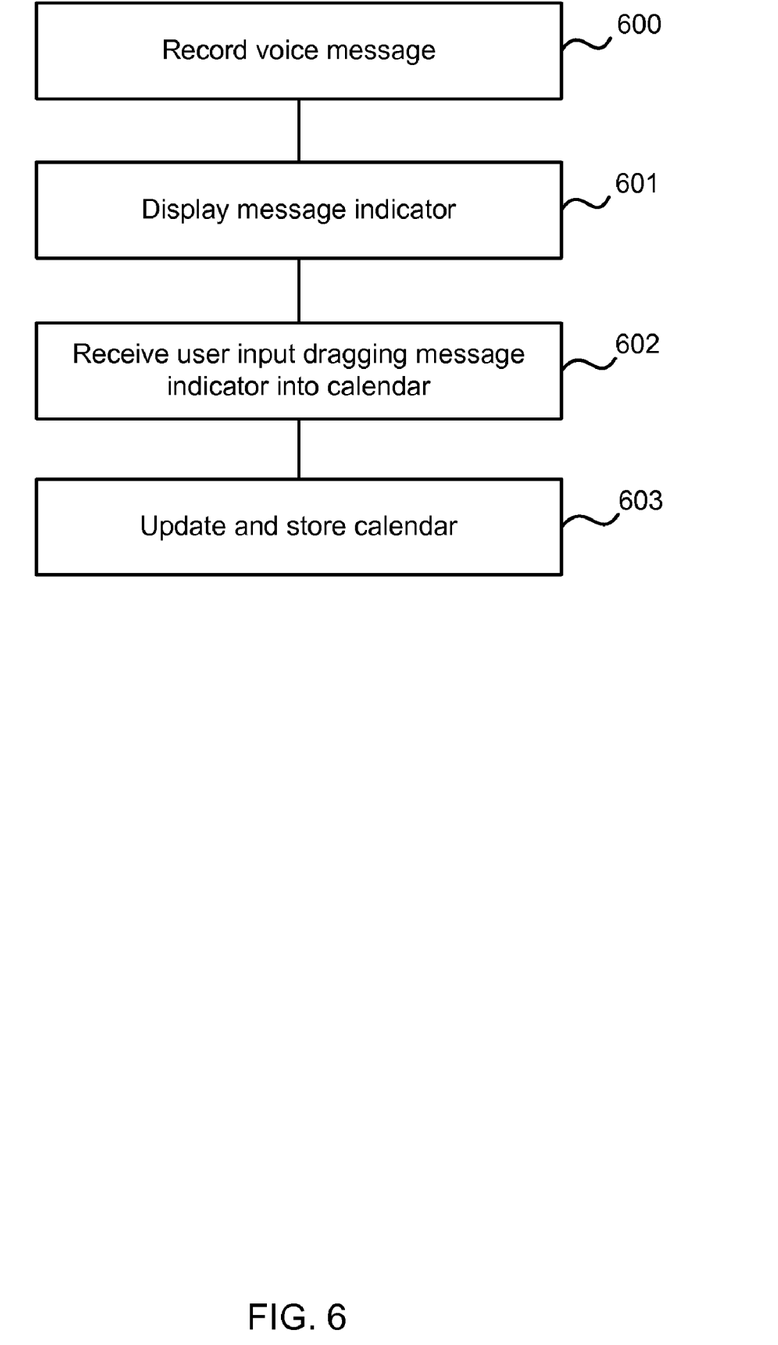
FIG. 6. is a block diagram of an example method of storing a voice message at an electronic calendar apparatus.

It is also possible for users to record voice messages at the calendar apparatus itself and store these in the calendar. A voice message is recorded (block 600) using a microphone at the calendar apparatus and an associated message indicator is displayed at the message receiver graphical user interface (block 601). User input is received to drag or copy that message indicator into the calendar (block 602) and the calendar is updated and stored (block 603).

Exemplary Computing-Based Device

Figure 7:
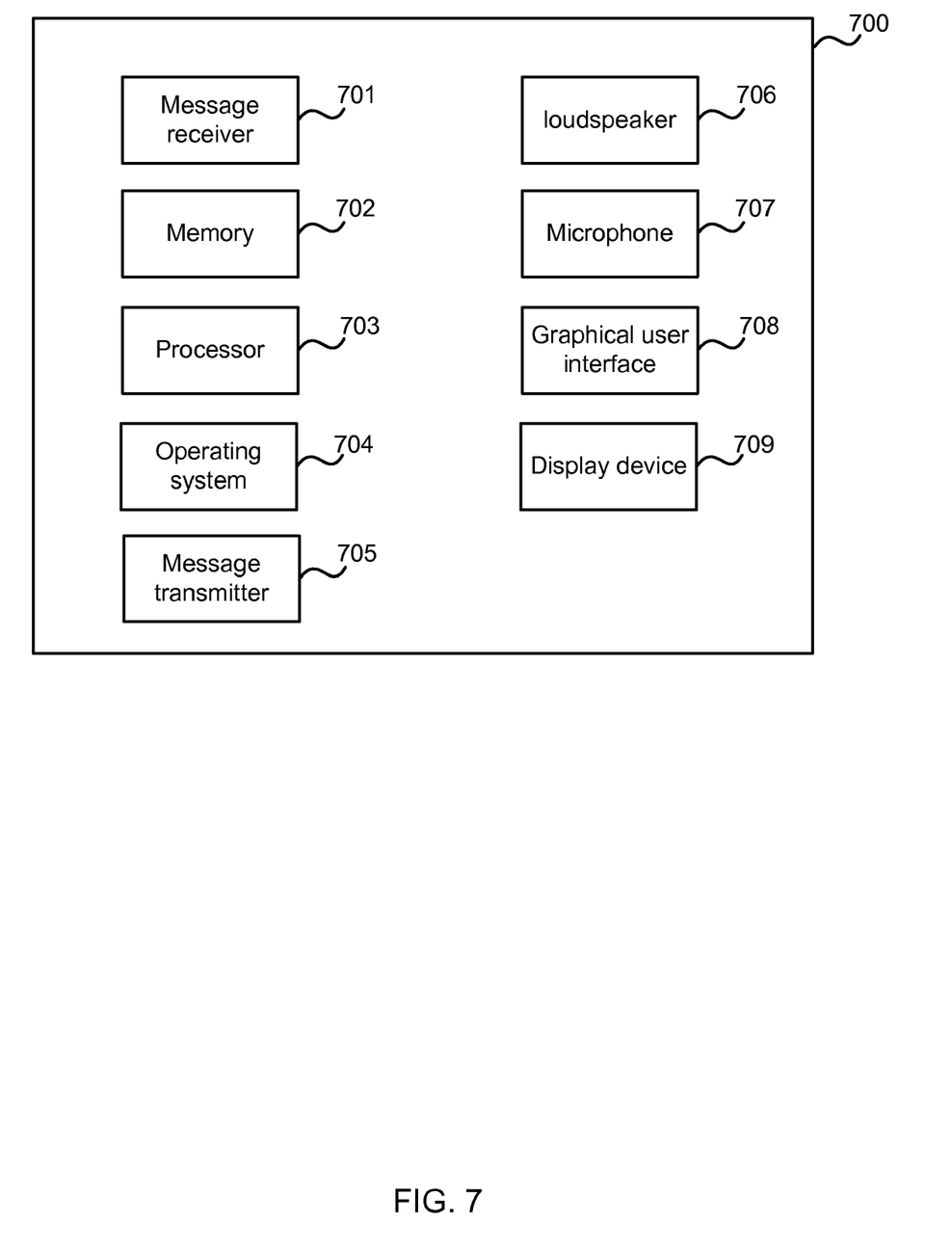
FIG. 7. illustrates an exemplary computing-based device in which embodiments of an electronic calendar apparatus may be implemented.

FIG. 7 illustrates various components of an exemplary computing-based device 700 which may be implemented as any form of a computing and/or electronic device, and in which embodiments of an electronic calendar apparatus may be implemented.

The computing-based device 700 comprises a message receiver 701 for receiving messages of any suitable type. Optionally, the computing-based device also comprises a message transmitter 705.

Computing-based device 700 also comprises one or more processors 703 which may be microprocessors, controllers or any other suitable type of processors for processing computer executable instructions to control the operation of the device in order to provide an electronic calendar apparatus as described herein. Platform software comprising an operating system 704 or any other suitable platform software may be provided at the computing-based device to enable the computer executable instructions to be executed on the device.

The computer executable instructions may be provided using any computer-readable media, such as memory 702. The memory is of any suitable type such as random access memory (RAM), a disk storage device of any type such as a magnetic or optical storage device, a hard disk drive, or a CD, DVD or other disc drive. Flash memory, EPROM or EEPROM may also be used.

The computing-based device 700 also optionally comprises a loudspeaker and/or a microphone 707. It incorporates a graphical user interface 708 and an associated display device 709.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a storage medium. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. It will further be understood that reference to 'an' item refer to one or more of those items.

The steps of the methods described herein may be carried out in any suitable order, or simultaneously where appropriate. Additionally, individual blocks may be deleted from any of the methods without departing from the spirit and scope of the subject matter described herein.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A method implemented on an electronic calendar apparatus by a processor configured to execute instructions that, when executed by the processor, direct the electronic calendar apparatus to perform acts comprising:
    displaying a graphical user interface comprising a first region having a calendar and a second region having a message receiver graphical user interface configured to display a first icon representing a voice message and a second icon representing a text message, wherein both the first region and the second region are visible simultaneously in a same display;
    receiving at least one message and storing that message;
    displaying a message indicator in the second region comprising the message receiver graphical user interface on the basis of the received message, wherein the message indicator comprises a name of the sender and an image representing the sender;
    receiving user input at the message receiver graphical user interface, the user input being associated with the displayed message indicator;
    presenting content of the received message by displaying the received message graphically at the graphical user interface;
    allowing editing of the calendar on the basis of user input received directly at the calendar apparatus;
    preventing, by the processor, editing of the calendar on the basis of user input received from an entity remote to the calendar apparatus; and
    receiving the user input at the graphical user interface, the user input comprising selection of a message indicator and dragging and dropping the message indicator by touch sensor screen finger commands into a specific day on the calendar.

2. A method as claimed in claim 1 further comprising receiving the message from a location remote of the electronic calendar apparatus.

3. A method as claimed in claim 1 wherein the process of receiving and storing a message comprises receiving and storing a message of a type selected from any of: email or short message service.

4. A method as claimed in claim 1 wherein the process of displaying a message indicator comprises displaying an icon of a type associated with a type of media of the received message.

5. A method as claimed in claim 1 which further comprises receiving user input made locally at the graphical user interface, that user input comprising selection of a message indicator and dragging that message indicator into the calendar.

6. A method as claimed in claim 1 which further comprises providing a subscriber identification module at the electronic calendar apparatus.

7. A method as claimed in claim 6 which further comprises displaying a telephone number at the graphical user interface the telephone number being associated with the electronic calendar apparatus.

8. A method implemented on an electronic calendar apparatus by a processor configured to execute instructions that, when executed by the processor, direct the electronic calendar apparatus to perform acts comprising:
    displaying a graphical user interface comprising a first region having a calendar and a second region having a message receiver graphical user interface configured to display a first icon representing a voice message and a second icon representing a text message, wherein both the first region and the second region are visible simultaneously in a same display;
    receiving at least one message from a remote communications terminal;
    storing the message locally on the electronic calendar apparatus;
    displaying a message indicator in the second region comprising the message receiver graphical user interface on the basis of the received message, wherein the message indicator comprises a name of a sender and an image representing the sender;
    receiving user input at the message receiver graphical user interface, that user input being associated with the displayed message indicator;
    presenting content of the received message;
    receiving the user input at the graphical user interface, that user input comprising selection of a message indicator and dragging and dropping that message indicator by touch sensor screen finger commands into a specific day on the calendar;
    storing the message indicator in association with the specific day on the calendar on the basis of that user input; and
    updating and presenting, by the processor, the calendar for viewing from the electronic calendar apparatus and from a remote location.

9. A method as claimed in claim 8 which comprises only allowing moving the message indicator from the second region comprising the message receiver graphical user interface to the first region comprising the calendar on the basis of user input received directly at the calendar apparatus and preventing user input communicated from an entity remote from the calendar apparatus from moving the message indicator from the second region comprising the message receiver graphical user interface to the first region comprising the calendar by one of:
    monitoring and preventing a remote editing access to the calendar; or
    disabling a functionality for remote editing access to the calendar.

10. A method as claimed in claim 8 wherein the process of receiving a message comprises receiving any of an email, a voice message and a short message service message.

11. A method as claimed in claim 8 which further comprises displaying a telephone number of the subscriber identification module at the graphical user interface.

12. An electronic calendar apparatus comprising:
    a display arranged to display a graphical user interface comprising a first region having a calendar and a second region having a message receiver graphical user interface configured to display a first icon representing a voice message and a second icon representing a text message, wherein both the first region and the second region are visible simultaneously in a same display;

a processor arranged to provide the graphical user interface;

a message receiver arranged to receiving at least one message;

a memory arranged to store received messages;

the processor being arranged to display a message indicator in the second region the message receiver graphical user interface on the basis of the received message, wherein the message indicator comprises a name of a sender and an image representing the sender;

the processor being arranged to receive user input at the message receiver graphical user interface, the user input being associated with the displayed message indicator;

the processor being arranged to provide the message receiver graphical user interface such that it is able to present content of the received message;

the processor being arranged to only allow editing of the calendar on the basis of user input received directly at the calendar apparatus without having been communicated from an entity remote of the calendar apparatus; and the processor being arranged to receive the user input at the graphical user interface, the user input comprising selection of a message indicator and dragging and dropping the message indicator by touch screen finger commands into a specific day on the calendar.

13. An apparatus as claimed in claim 12 wherein the processor is arranged to provide the graphical user interface such that user input comprising selection of a message indicator and dragging of that message indicator into the calendar is enabled.

14. An apparatus as claimed in claim 12 wherein the memory is also arranged to store message indicators in the calendar and wherein the calendar is arranged to present content of messages associated with message indicators stored therein.

15. An apparatus as claimed in claim 12 wherein the message receiver is arranged to receive any one or more of email, short message service messages and voice messages.

16. An apparatus as claimed in claim 12 which further comprises one or more loudspeakers arranged to play any sound recordings received as part of a message.

17. An apparatus as claimed in claim 12 which further comprises one or more microphones arranged to record voice messages for adding to the calendar.

18. An apparatus as claimed in claim 12 which further comprises a transmitter arranged to send reminders from the calendar to other entities.

19. An apparatus as claimed in claim 12 which comprises a tablet personal computer having a subscriber identification module and a GPRS card.

20. An apparatus as claimed in claim 12 which is provided in a protective housing suitable for enabling use of the apparatus in a domestic kitchen.

* * * * *